United States Patent
Yu Tseng et al.

(10) Patent No.: US 12,314,652 B2
(45) Date of Patent: May 27, 2025

(54) METHODS AND NON-TRANSITORY COMPUTER-READABLE MEDIA FOR INTER-METAL DIELECTRIC RELIABILITY CHECK

(71) Applicant: TAIWAN SEMICONDUCTOR MANUFACTURING COMPANY LTD., Hsinchu (TW)

(72) Inventors: Hsien Yu Tseng, Miaoli County (TW); Wei-Ming Chen, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 630 days.

(21) Appl. No.: 17/673,205

(22) Filed: Feb. 16, 2022

(65) Prior Publication Data
US 2023/0259688 A1   Aug. 17, 2023

(51) Int. Cl.
*G06F 30/398* (2020.01)
*G06F 30/392* (2020.01)
*G06F 119/06* (2020.01)

(52) U.S. Cl.
CPC .......... *G06F 30/398* (2020.01); *G06F 30/392* (2020.01); *G06F 2119/06* (2020.01)

(58) Field of Classification Search
CPC .. G06F 30/398; G06F 30/392; G06F 2119/06; G06F 30/367
See application file for complete search history.

(56) References Cited

U.S. PATENT DOCUMENTS

| | | | | |
|---|---|---|---|---|
| 9,547,742 | B2 * | 1/2017 | Yuan | G06F 30/392 |
| 10,181,004 | B1 * | 1/2019 | Larsen | G06F 30/394 |
| 10,621,386 | B1 * | 4/2020 | Chen | G06F 30/367 |
| 2013/0038334 | A1 * | 2/2013 | Brochu, Jr. | G01R 31/2858 |
| | | | | 324/555 |
| 2014/0007031 | A1 * | 1/2014 | Huang | G06F 30/394 |
| | | | | 716/112 |
| 2014/0096098 | A1 * | 4/2014 | Weir | G06F 30/20 |
| | | | | 716/112 |

(Continued)

OTHER PUBLICATIONS

N. Suzumura, M. Ogasawara, T. Furuhashi and T. Koyama, "Study on vertical TDDB degradation mechanism and its relation to lateral TDDB in Cu/low-k damascene structures," 2014 IEEE International Reliability Physics Symposium, 2014, pp. 3A.4.1-3A.4.6, doi: 10.1109/IRPS.2014.6860613.

*Primary Examiner* — Nha T Nguyen
(74) *Attorney, Agent, or Firm* — WPAT LAW; Anthony King

(57) ABSTRACT

The present disclosure provides a method and a non-transitory computer readable media for inter-metal dielectric reliability check. The method comprises: receiving an electronic layout, the electronic layout including a first plurality of electrical components in a first layer; determining an internal voltage difference within each electrical component in the first layer based on parasitic effect; generating a simulation voltage value for each electrical component in the first layer based on the internal voltage differences; and tagging a pair of electrical components in the first layer when a first voltage difference between the pair of electrical components exceeds a first voltage threshold. The first voltage difference is determined based on the simulation voltage value of each electrical component.

20 Claims, 9 Drawing Sheets

(56) References Cited

U.S. PATENT DOCUMENTS

| | | | |
|---|---|---|---|
| 2015/0310155 A1* | 10/2015 | Banerjee | G03F 1/36 |
| | | | 716/53 |
| 2015/0379188 A1* | 12/2015 | Kahng | G06F 30/398 |
| | | | 716/112 |
| 2017/0169146 A1* | 6/2017 | Chen | G06F 30/33 |
| 2018/0341742 A1* | 11/2018 | Yazdani | G06F 16/211 |
| 2023/0160944 A1* | 5/2023 | Zhou | G01R 31/2601 |
| | | | 702/120 |

* cited by examiner

METHODS AND NON-TRANSITORY COMPUTER-READABLE MEDIA FOR INTER-METAL DIELECTRIC RELIABILITY CHECK

BACKGROUND

An integrated circuit (IC) typically includes a number of semiconductor devices represented in an IC layout diagram. The IC layout diagram is generated from an IC schematic, such as an electrical diagram of the IC. At various steps during the IC design process, from the IC schematic to the IC layout diagram for actual manufacture of the IC, various checks and tests are performed to make sure that the IC can be made and will function as designed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
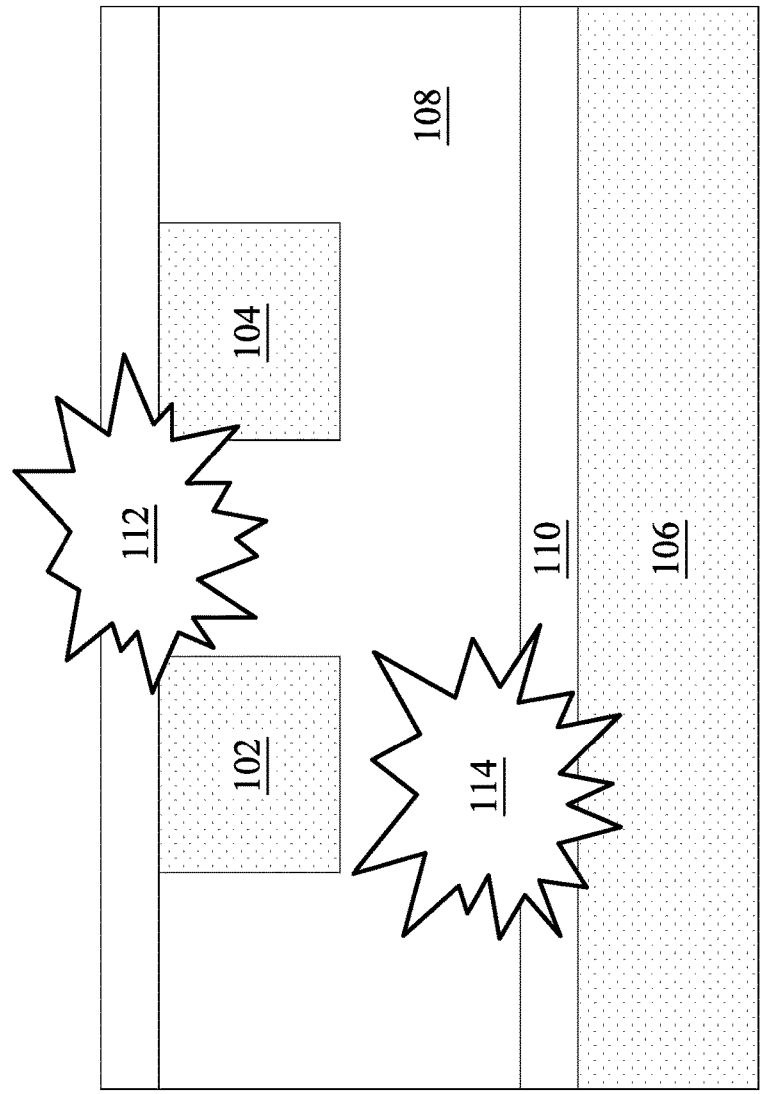
FIG. 1 is a schematic diagram showing dielectric breakdowns in a cross-section view in accordance with some embodiments of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like are also contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Furthermore, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in the respective testing measurements. Also, as used herein, the terms "substantially," "approximately" and "about" generally mean within a value or range that can be contemplated by people having ordinary skill in the art. Alternatively, the terms "substantially," "approximately" and "about" mean within an acceptable standard error of the mean when considered by one of ordinary skill in the art. People having ordinary skill in the art can understand that the acceptable standard error may vary according to different technologies. Other than in the operating/working examples, or unless otherwise expressly specified, all of the numerical ranges, amounts, values and percentages such as those for quantities of materials, durations of times, temperatures, operating conditions, ratios of amounts, and the like thereof disclosed herein should be understood as modified in all instances by the terms "substantially," "approximately" or "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

There are a number of physical failure mechanisms that can affect the reliability of a semiconductor device. For example, dielectric breakdown (or electrical breakdown) is a process that occurs when an electrical insulating material, subjected to a high enough voltage, suddenly becomes an electrical conductor and electric current flows through it. All insulating materials undergo dielectric breakdown when the electric field caused by an applied voltage exceeds the material's dielectric strength, which varies depending on different types, sizes, and shapes of the insulating material. Under sufficient electrical potential, electrical breakdown can occur within solids, liquids, gases, or vacuum. As a consequence, dielectric breakdowns may also occur inside circuits or layouts structures as long as the voltage difference between metal components exceeds the breakdown voltage of the "sandwiched" barrier dielectric.

Referring now to FIG. 1, it shows a cross-section view illustrating dielectric breakdowns that may occur inside the structure 100. Structure 100 includes metal components 102, 104, and 106. The metal components may function as wires.

The metal components may be made of copper or other conductive material. As shown in FIG. 1, metal components 102 and 104 are located in the same layer or level. Metal component 106 is located in a different layer or level from that of metal components 102 and 104. Dielectric material 108 is disposed between metal components 102 and 104. Dielectric material 110 is disposed between different layers in structure 100. Dielectric materials 108 and 110 may be made of any material that can provide insulation between the metal components 102, 104, and 106.

When the voltage difference between metal components 102 and 104 is high enough, dielectric breakdown 112 may occur. As mentioned, the size of the insulating material is one of the deciding factors of the breakdown voltage. Thus, when the spacing between the metal components 102 and 104 is small enough, even a common or ordinary voltage difference between the metal components 102 and 104 may cause a dielectric breakdown. This issue has become more critical because the desired size and thickness of electronic devices are becoming smaller, resulting in shrinkage of spacing between metal components in layouts.

Although the spacing between metal components in the same level (i.e., intra-level metals) is usually smaller than that between metal components in different levels (i.e., inter-level metals), dielectric breakdown may also occur between metal components in different levels (for example, dielectric breakdown 114).

To avoid undesired dielectric breakdown, dielectric breakdown reliability tests can be performed. However, one of the disadvantages of reliability tests is the time it takes to obtain test results. Depending on packaging time of the device and performance, a reliability test can run several days. Therefore, a more efficient reliability test methodology or algorithm is needed.

Figure 2:
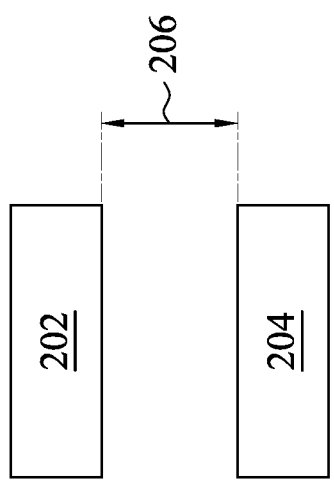
FIG. 2 is a schematic diagram showing a minimum spacing between metal components in accordance with some embodiments of the present disclosure.

Referring now to FIG. 2, metal components 202 and 204 are spaced apart by a spacing 206. With a given metal type, ambient temperature, and voltage difference between metal components 202 and 204, the minimum spacing required for spacing 206 to ensure dielectric breakdown reliability can be calculated. In another embodiment, with a given metal type, ambient temperature, and spacing 206, the maximum voltage difference between metal components 202 and 204 to ensure dielectric breakdown reliability can also be calculated.

Figure 3:
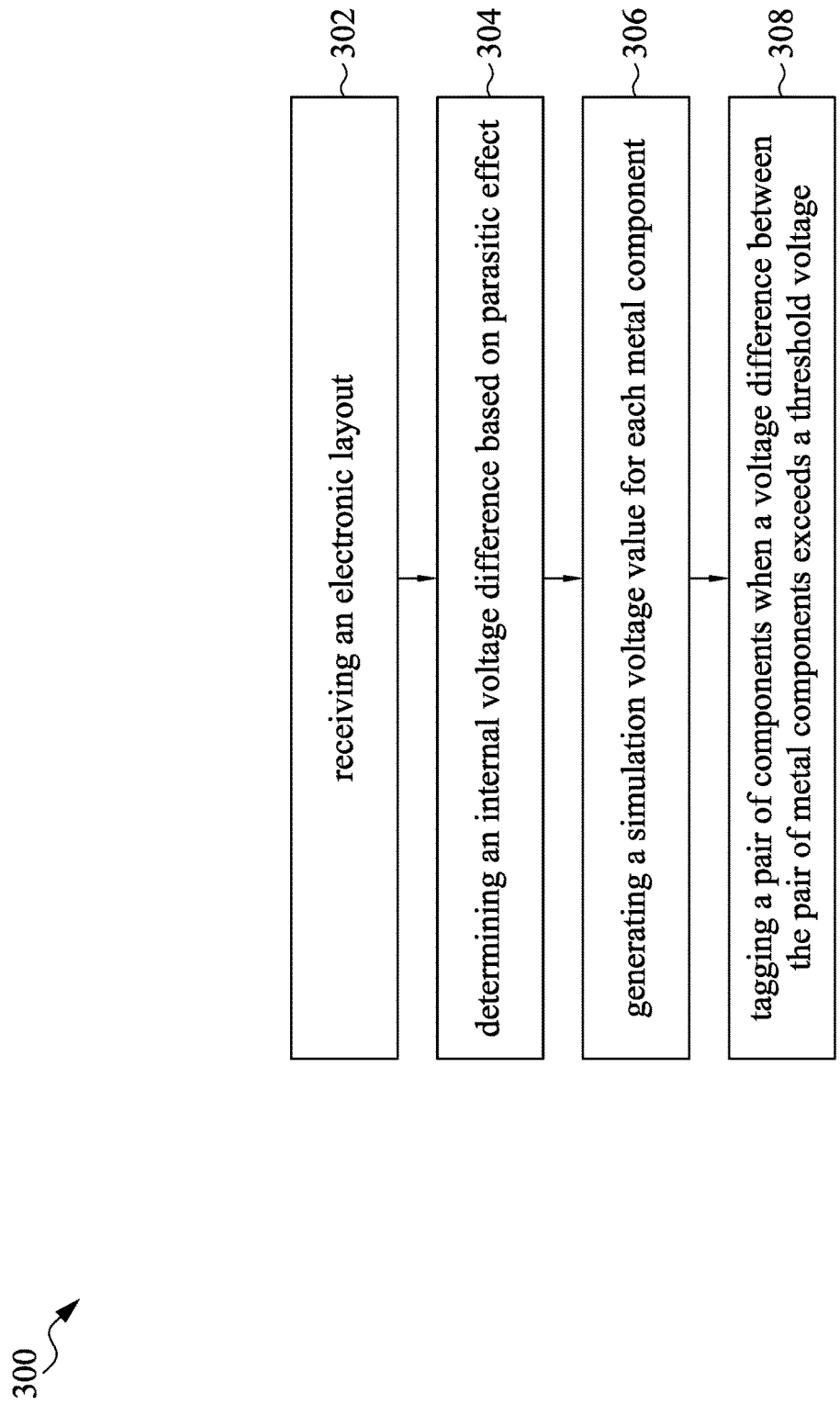
FIG. 3 is a functional flow chart of a method in accordance with some embodiments of the present disclosure.

Referring now to FIG. 3, it shows a flow chart of a method 300 in accordance with some embodiments of the present disclosure. In at least one embodiment, method 300 may be performed in whole or in part by a processor as described herein. Method 300 utilizes one or more electronic design automation (EDA) tools for testing a design of a semiconductor device before manufacturing the same device. The EDA tools in some embodiments of the present disclosure are one or more sets of executable instructions for execution by a processor or controller or a programmed computer to perform the indicated functionality.

At operation 302, an electronic layout is read or received. In at least one embodiment, the electronic layout is received or read from a non-transitory, computer readable storage medium. The electronic layout may be generated based on a design of a semiconductor device, which may include a schematic, i.e., an electrical diagram, of a semiconductor device. A schematic is generated or provided in the form of a schematic netlist, such as a Simulation Program with Integrated Circuit Emphasis (SPICE) netlist.

At operation 304, an internal voltage difference of each metal component in the electronic layout based on parasitic effect (e.g., parasitic resistance, parasitic inductance, and/or parasitic capacitance) is calculated or determined by one or more EDA tools. The operation 304 may be resistance and capacitance (RC) extraction that at least determines or estimates the non-ideal voltage drop within each metal component.

Figures 4A, 4B:
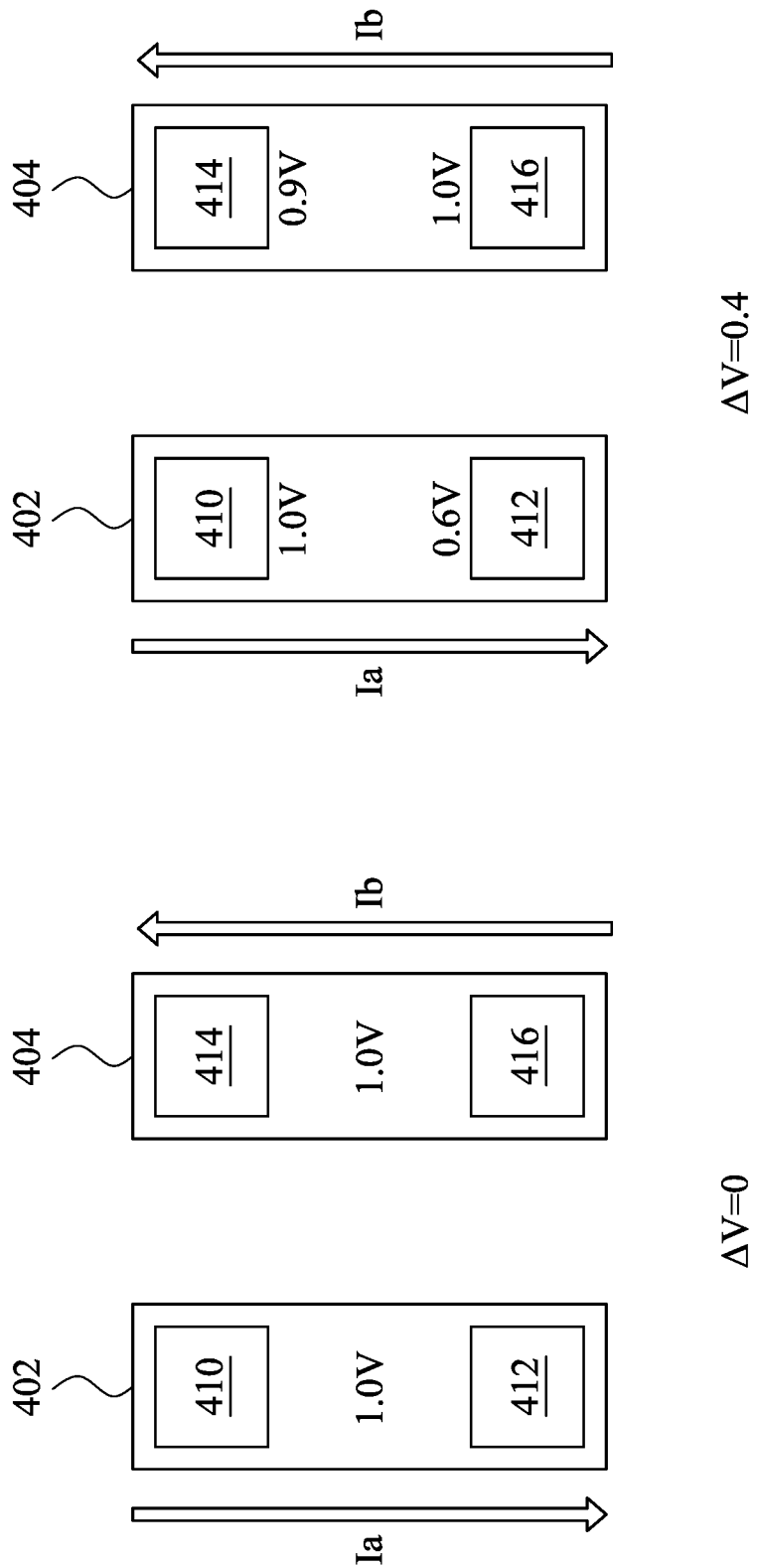
FIGS. 4A and 4B are schematic diagrams showing that internal voltage differences between metal components in accordance with some embodiments of the present disclosure.

For example, FIGS. 4A and 4B show the input and output of the RC extraction, respectively. In FIG. 4A, current $I_a$ flows downward through metal component 402. The current $I_a$ flows from point 410 to point 412. Current $I_b$ flows upward through metal component 404. The current $I_b$ flows from point 416 to point 414. The voltages on points 410, 412, 414, and 416 may be all 1 V in ideal conditions, and no voltage difference may exist between metal components 402 and 404.

In contrast, in FIG. 4B, taking the parasitic effects into account, while currents $I_a$ and $I_b$ and the voltage on points 410 and 416 maintain the same value as those applied in FIG. 4A, the voltage on point 412 may drop to 0.6 V and the voltage on point 414 may drop to 0.9 V. Therefore, a voltage difference between metal components 402 and 404 would be caused. In the embodiment of FIG. 4B, the maximum voltage difference between metal components 402 and 404 is 0.4 V (i.e., 1 V–0.6 V=0.4 V).

The voltage drop caused by parasitic effects may be negligible if the length of the metal component is sufficiently short. However, when the length of metal component is long enough, the voltage drop caused by parasitic effects would be noticeable. In other words, the RC extraction performed in the operation 304 may be performed on metal components whose length exceeds a predetermined length threshold.

In accordance with some embodiments of the present disclosure, the RC extraction may be only performed on metal components whose length exceeds a predetermined length threshold.

In accordance with some embodiments of the present disclosure, the disclosed method may further comprise receiving an electronic layout, in which the electronic layout includes a first plurality of metal components in a first layer. An internal voltage difference within each first metal component in the first layer may be determined based on parasitic effect when a length of first metal component is greater than a predetermined length. A first simulation voltage value for each first metal component in the first layer based on the internal voltage differences can be generated. A second simulation voltage value for each second metal component in the first layer can be generated, in which a length of the second metal component is not greater than the predetermined length. Voltage differences between any two of the metal components in the first layer can be determined based on the first simulation voltage value and the second simulation voltage value. If the voltage difference between a pair of metal components in the first layer exceeds a voltage threshold, the pair of metal components in the first layer will be tagged. In some embodiments of the present disclosure, the voltage threshold regarding the voltage differences may be determined based on a lifetime, a yield, and an operation temperature for the electronic layout or related electronic devices. Detail information about the lifetime, the yield, and the operation temperature will be further described below.

Referring back to FIG. 3, at operation 306, a simulation voltage value for each metal component in the electronic layout is generated by a simulation tool, i.e., an EDA tool, taking into account the internal voltage difference of each metal component in the electronic layout.

At operation 308, as long as the voltage difference between a pair of metal components exceeds a voltage threshold, the pair of metal components is tagged by a simulation tool. i.e., an EDA tool. User or IC designers may not need to tag or mark metal components that the voltages on which exceed the voltage threshold on manual. Manual tagging is time-consuming and may subject to carelessness. In contrast, the disclosed method improves efficiency and guarantees that the tagging is correct. The tagging may be performed for further check or verification of the electronic layout, which will be further described below. The value of the voltage threshold may be determined based on the breakdown voltage for the dielectric material between metal components. The value of the voltage threshold may be determined based on the dielectric material between the metal components. The value of the voltage threshold may be determined based on the spacing between two metal components. The value of the voltage threshold may be determined based on at least one of a lifetime, a yield, and an operation temperature of the electronic circuit corresponding to the electronic layout.

Sometimes, the lifetime, yield, and operation temperature are relatively challenging such that the voltage threshold is relatively low. The relatively low voltage threshold renders the voltage difference between a pair of metal components easily exceeds the voltage threshold so that the cost of design increases. However, in certain scenarios, for example, cost-sensitive final product, consumer electronics that operate near room temperature (or other non-extreme environment), or products expected to be worn out for a shorter period, the voltage threshold can be exceeded for a certain percentage. In other words, the threshold can be relaxed for a certain percent, that is, a certain percentage violation is in fact acceptable. With the relaxed dielectric breakdown reliability checking rule, extreme conditions are excluded, the design of the electronic layout can be more flexible, and the cost of design can be saved.

For example, in a more challenging scenario, the value of the voltage threshold determined with 100% yield, 105° C. operation temperature, and 10-year lifetime may be 1 V. In contrast, for a cost-sensitive final product, the value of the voltage threshold determined with 99.7% yield, 100° C. operation temperature, and 5-year lifetime may be 1.2 V. The relaxed voltage threshold (1.2 V) is 20% higher than the original voltage threshold (1 V). That is, a 20% violation of the breakdown voltage is acceptable.

Corrections corresponding to the tagged metal components are made to at least one of the electronic layout or the design. The said corrections may include adjusting the spacing between the tagged pair of metal components. The voltage difference between a pair of metal components is calculated at least according to the simulation voltage value for each metal component in the electronic layout.

The operation 308 may be a design rule check (DRC) or a voltage-dependent design rule check (VDRC). The excess of the voltage threshold may be a violation of the rule. In at least some embodiments of the present disclosure, the operation 308 is performed for the metal components within the same level of the electronic layout to check whether the noted rule is violated.

In some other embodiments of the present disclosure, the operation 308 is also performed for the metal components in different levels of the electronic layout to check whether the noted rule is violated. For example, the disclosed method may include receiving an electronic layout. The electronic layout may include a first plurality of metal components in a lower layer and a second plurality of metal components in an upper layer. The upper layer may be adjacent to or next to the lower layer. The method may further include determining an internal voltage difference within each metal component in the lower layer and the upper layer based on parasitic effect. A simulation voltage value for each metal component in the lower layer and the upper layer based on the internal voltage differences may be generated in accordance with the disclosed method. A first voltage difference may be determined according to the simulation voltage value of each metal component in the lower layer and the upper layer. If the first voltage difference between any two of the metal components in the same layer (e.g., the lower layer or the upper layer) exceeds a first voltage threshold, then the pair of metal components in the same layer (e.g., the lower layer or the upper layer) would be tagged. In addition, if a second voltage difference between the a metal component in the lower layer and a metal component in the upper layer exceeds a second voltage threshold, the metal component in the lower layer and the metal component in the upper layer would be tagged.

As a non-limiting example, the method can be further extended to an electronic layout with three or more layers. In this case, the inter-level metal dielectric reliability check may be performed between two adjacent layers, for example, between an upper layer and an intermediate layer or between the intermediate layer and a lower layer.

Figure 5A:
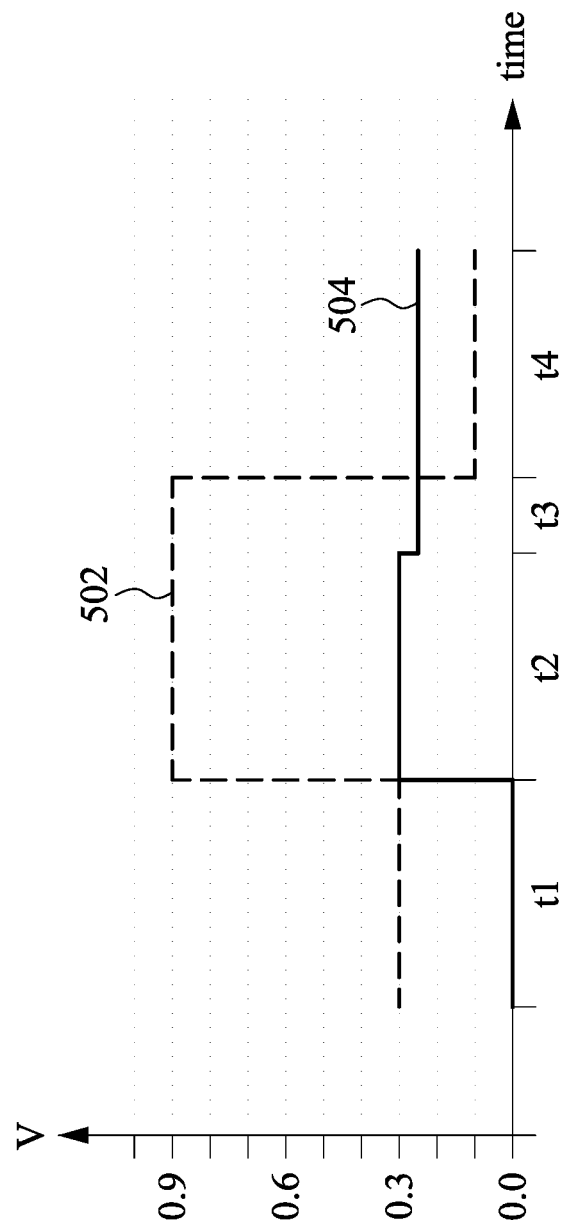
FIG. 5A is a voltage-time graph for metal components in accordance with some embodiments of the present disclosure.

Referring to FIG. 5A, it shows voltage-time graphs for metal components 502 and 504. In FIG. 5A, the x-axis indicates the time, and the y-axis indicates the voltage value. There are at least two methods for determining the voltage difference between a pair of metal components, for example metal components 502 and 504.

The first method may be referred to as "asynchronous method." In the first method, the observed timings of the voltages on the metal components (or electrical components) are not taken into consideration. According to the first method, the voltage difference is determined as the larger of the following two values. (i) the maximum voltage on a first metal component of the pair of metal components minus the minimum voltage on a second metal component of the pair of metal components, and (ii) the maximum voltage on the second metal component of the pair of metal components minus the minimum voltage on the first metal component of the pair of metal components.

Taking FIG. 5A for example, in the first method, the voltage difference between metal components 502 and 504 will be determined as the larger of the following two values: (i) 0.9 V (the maximum voltage on metal component 502)−0 V (the minimum voltage on metal component 504)=0.9 V. and (ii) 0.3 V (the maximum voltage on metal component 504)−0.1 V (the minimum voltage on metal component 502)=0.2 V. The voltage difference determined by the first method is 0.9 V since it is the larger of the two values.

The second method may be referred to as "synchronous method." In accordance with some embodiments of the present disclosure, the second method takes the observed timings of the voltages on the metal components (or electrical components) into consideration. In the second method, the voltages observed at the same timing or the same time period would be compared. In some embodiments of the present disclosure, the voltage difference is determined as the maximum voltage difference observed at the same time or in the same time period. Taking FIG. 5A for example, the voltage difference within time period t1 is 0.3 V (0.3 V−0 V). The voltage differences within time period t2 is 0.6 V (0.9 V−0.3 V). The voltage differences within time period t3 is 0.65 V (0.9 V−0.25 V). The voltage differences within time period t4 is 0.15 V (0.25 V−0.1 V). Therefore, the maximum voltage difference between metal components 502 and 504 is determined as 0.6 V.

The voltage difference determined by the first method may be greater than or equal to that determined by the second method. In the example of FIG. 5A, the voltage difference determined by the first method is greater than that determined by the second. The voltage difference determined by the first method may give pessimistic estimations. Due to the pessimistic estimations, the spacing between metal components (or electrical components) would be needlessly increased, and the circuit density of a wafer would needlessly decreased. Therefore, the cost of production would increase. To put it another way, the second method gives a more accurate voltage difference between metal components and better estimation and prevention with regard to dielectric breakdown reliability.

Figure 5B:
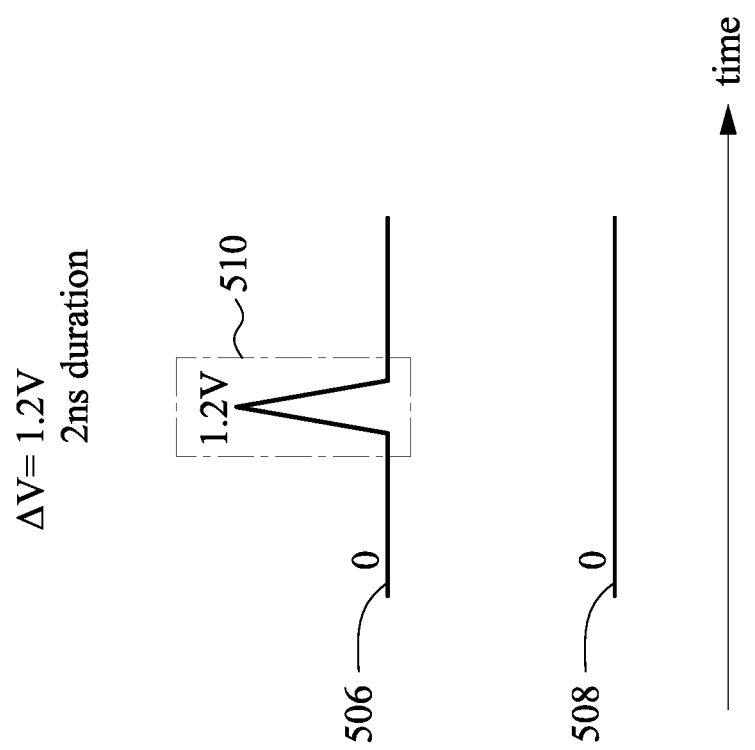
FIG. 5B is a voltage-time graph for metal components in accordance with some embodiments of the present disclosure.

Referring to FIG. 5B, it shows a voltage-time graph for metal components 506 and 508. In FIG. 5B, the x-axis indicates the time, but they-axis does not indicate the voltage value. For clarity, the voltages on each metal component within a time period are displayed in the accompanying text. FIG. 5B disclose a further consideration that can be preferably applied in the method of determining voltage differences between two metal components. As mentioned earlier, dielectric breakdown may occur when the voltage difference between metal components is high enough. However, if the high-enough voltage difference only persists for a very short time, dielectric breakdown will not occur. For example, as shown in FIG. 5B, the voltage difference of 1.2 V may occur between the metal components 506 and 508. However, because the voltage difference of 1.2 V is a 2-nanosecond transient spike 510 as shown in in FIG. 5B, dielectric breakdown may not occur between the metal components 506 and 508. To put it another way, dielectric breakdown may occur when the high-enough voltage difference persists for at least a predetermined period. The predetermined period is determined based on the voltage difference between metal components and/or the dielectric material between metal components. With other conditions being equal, the predetermined period will be lower if the voltage difference between metal components is greater. With other conditions being equal, the predetermined period will be lower if the k value of the dielectric material is greater. With the voltage difference caused by a transient spike being ignored, the result of the dielectric breakdown reliability test can be more accurate because the voltage difference would not be overly pessimistic.

In accordance with some embodiments of the present disclosure, the metal type data of each electrical component in the electronic layout can be extracted by one or more EDA tools. The dielectric breakdown voltage may depend on the metal types, so the extracted metal type data can be used as a factor when determining the dielectric breakdown voltage between a pair of metal components in the electronic layout.

In accordance with some other embodiments of the present disclosure, the location data of each electrical component in the electronic layout can also be extracted by one or more EDA tools. The extracted location data may be in Detailed Standard Parasitic Format (DSPF). With the extracted location data, the neighboring relationship of each electrical component in the electronic layout can be determined or calculated by one or more EDA tools. Since dielectric breakdown cannot occur between two metal components without affecting an intermediate metal component therebetween, the operation 308 in FIG. 3 may be performed on two adjacent metal components (i.e., a pair of adjacent metal components) in the electronic layout without affecting the result of the operation 308.

Figure 6A:
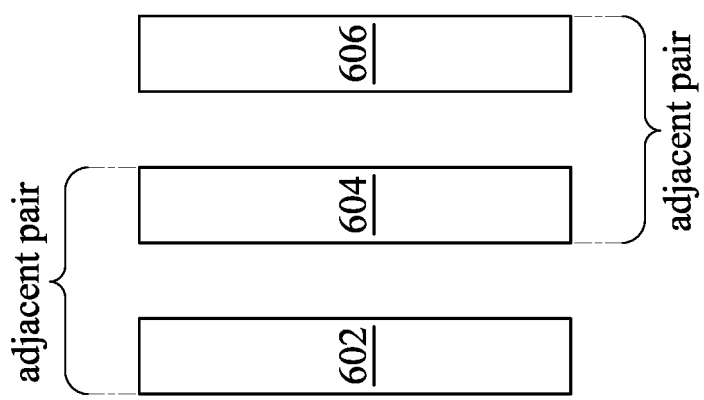
FIGS. 6A and 6B are schematic diagrams showing filter conditions for dielectric breakdown reliability tests in accordance with some embodiments of the present disclosure.

Taking FIG. 6A for example, if dielectric breakdown occurs between metal components 602 and 606, dielectric breakdown must also occur between either metal components 602 and 604 or metal components 604 and 606. Accordingly, the operation 308 may be performed on (1) the pair of metal components 602 and 604, and (2) the pair of metal components 604 and 606. With such filter condition, unnecessary checking, for example, check for the pair of metal components 602 and 606, can be omitted without affecting the final result. Compared with a complete test that needs checks on the metal components 602 and 604, the metal components 604 and 606, and the metal components 602 and 606, the test of the present disclosure may need checks on the metal components 602 and 604 and the metal components 604 and 606. That is, a complete test may 3 checks, and the test of the present disclosure may 2 checks. The efficiency of dielectric breakdown reliability testing may be increased by at least 50 percent.

The efficiency of dielectric breakdown reliability testing can be increased by a more percentage when the number of metal components increases. For example, four metal components are disposed in parallel in an electronic layout. A complete test may need 6 checks (e.g., combination of choosing 4 from 2). However, the test of the subject disclosure, which checks the adjacent metal components, may only needs 3 checks. The efficiency of dielectric breakdown reliability testing is increased by 100 percent.

With the extracted location data, the neighboring relationship of each electrical component in the electronic layout can be determined or calculated. Following similar logic, in accordance with some embodiments of the present disclosure, the operation 308 in FIG. 3 may be performed only on metal components that are within a space of interest without affecting the result of the operation 308. Distance between metal components is an important factor during dielectric breakdown reliability testing. Thus, when two metal components are too distant from each other, they may be excluded from the check of dielectric breakdown reliability therebetween.

Figure 6B:
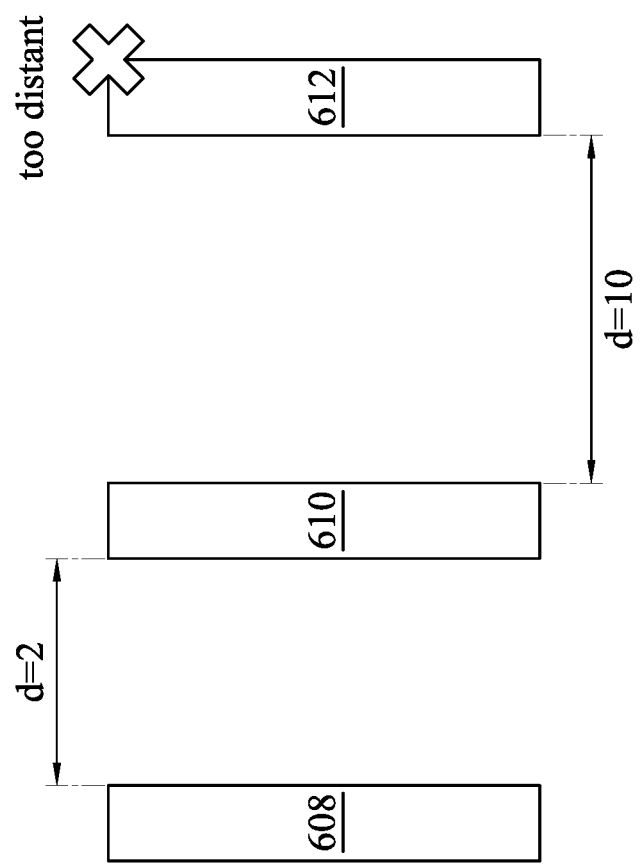

Taking FIG. 6B for example, the spacing between metal components 608 and 610 is 2 length units and the spacing between metal components 610 and 612 is 10 length units. If the space of interest is 3 length units (e.g., the predetermined spacing threshold is 3 length units), the operation 308 would be performed on the pair of metal components 608 and 610 because the spacing between the pair of metal components 608 and 610 is smaller than 3 length units. Since the spacing between metal components 610 and 612 is greater than 3 length units (e.g., too distant), the occurrence of dielectric breakdown is rare, and the dielectric breakdown reliability test between metal components 610 and 612 would be omitted. With such filter condition, unnecessary checking can be omitted and the efficiency of dielectric breakdown reliability testing can also be increased.

With the extracted location data, the neighboring relationship of each electrical component in the electronic layout can be determined or calculated. The value of the voltage threshold applied in the operation 308 may be determined based on the spacing between two metal components. For example, when the spacing is not greater than 1 length unit, the value of the voltage threshold may be 0.2 V. When the spacing is greater than 1 length unit and not greater than 2 length units, the value of the voltage threshold may be 0.5

V. When the spacing is greater 2 length units and not greater than 3 length units, the value of the voltage threshold may be 0.8 V.

Figure 7:
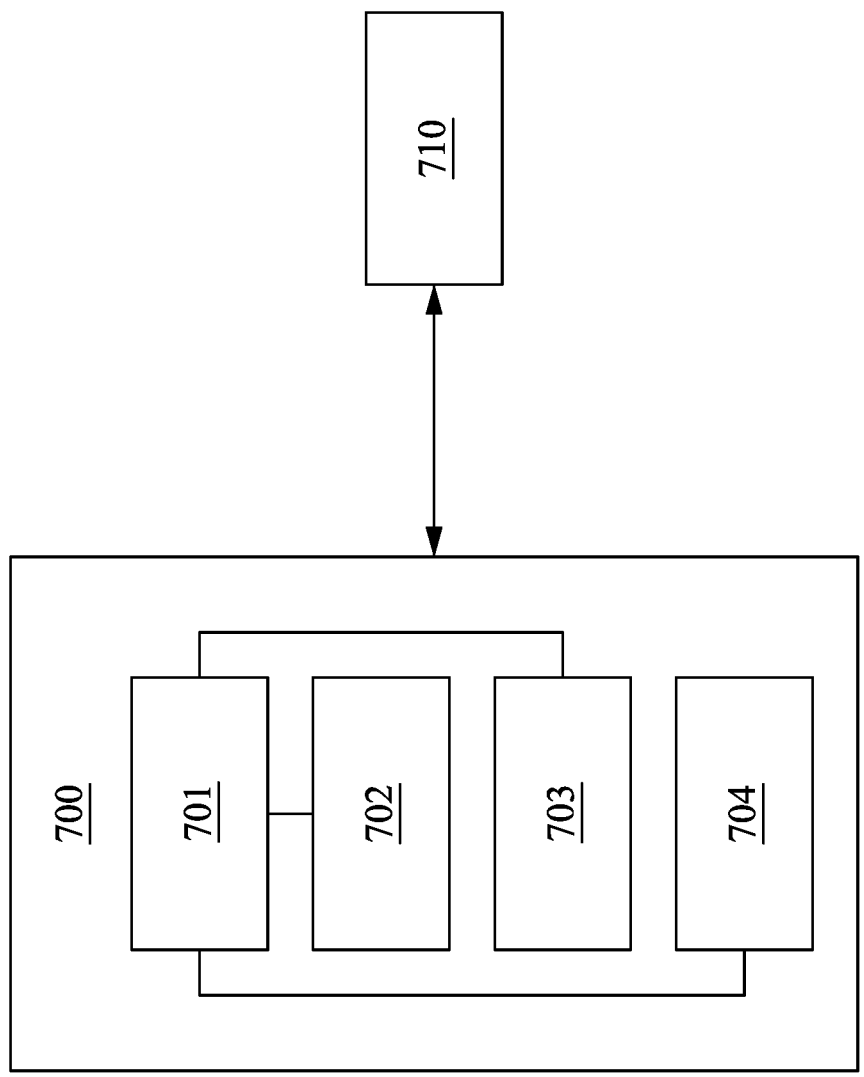
FIG. 7 is a schematic diagram showing a computer system in accordance with some embodiments of the present disclosure.

Referring to FIG. 7, it shows an example of a computer system capable of performing one or more operations of the methods of the present disclosure. The computer system includes, in at least some embodiments of the present disclosure, a database 710 and a computing device 700. The computing device 700 may be a server computer, a client computer, a personal computer (PC), a tablet PC, a set-top box (STB), a personal digital assistant (PDA), a cellular telephone, or a smartphone. The computing device 700 comprises processor 701, input/output interface 702, communication interface 703, and memory 704. The database 710 may store criteria determining whether voltage-dependent design rule check (VDRC) is violated. The input/output interface 702 is coupled with the processor 701. The input/output interface 702 allows the user to manipulate the computing device 700 in order to perform the methods of the present disclosure (e.g., the method disclosed in FIG. 3). The communication interface 703 is coupled with the processor 701. The communication interface 703 allows the computing device 700 to communicate with the database 710. A memory 704 may be a non-transitory computer readable storage medium. The memory 704 is coupled with the processor 701. The memory 704 has stored program instructions that can be executed by one or more processors (for example, the processor 701). Upon execution of the program instructions stored on the memory 704, the program instructions cause performance of the one or more operations of the method disclosed in the present disclosure. For example, the program instructions may cause the computing device 700 to perform a set of acts that at least include: (i) receiving an electronic layout, the electronic layout including a first plurality of electrical components in a first layer; (ii) determining an internal voltage difference within each electrical component in the first layer based on parasitic effect; (iii) generating a simulation voltage value for each electrical component in the first layer based on the internal voltage differences; and (iv) tagging a pair of electrical components in the first layer when a first voltage difference between the pair of electrical components exceeds a first voltage threshold. The first voltage difference is determined based on the simulation voltage value of each electrical component.

As another exemplary example, the program instructions may cause the computing device 700 to perform a set of acts that at least include; (i) receiving an electronic layout, the electronic layout including a first plurality of electrical components in a first layer; (ii) determining an internal voltage difference within each first electrical component in the first layer based on parasitic effect when a length of the first electrical component is greater than a predetermined length; (iii) generating a first simulation voltage value for each first electrical component in the first layer based on the internal voltage differences; (iv) generating a second simulation voltage value for each second electrical component in the first layer, wherein a length of the second electrical component is not greater than the predetermined length; and (v) tagging a pair of electrical components in the first layer when a first voltage difference between the pair of electrical components exceeds a first voltage threshold. The first voltage difference is determined based on the first simulation voltage values and the second simulation voltage values. The first voltage threshold is determined based on a lifetime, a yield, and an operation temperature for the electronic layout.

Some embodiments of the present disclosure provide a method. The method comprises: receiving an electronic layout, the electronic layout including a first plurality of electrical components in a first layer; determining an internal voltage difference within each electrical component in the first layer based on parasitic effect; generating a simulation voltage value for each electrical component in the first layer based on the internal voltage differences; and tagging a pair of electrical components in the first layer when a first voltage difference between the pair of electrical components exceeds a first voltage threshold. The first voltage difference is determined based the simulation voltage value of each electrical component.

Some embodiments of the present disclosure provide another method. The method comprises: receiving an electronic layout, the electronic layout including a first plurality of electrical components in a first layer; determining an internal voltage difference within each first electrical component in the first layer based on parasitic effect when a length of the first electrical component is greater than a predetermined length; generating a first simulation voltage value for each first electrical component in the first layer based on the internal voltage differences; generating a second simulation voltage value for each second electrical component in the first layer, wherein a length of the second electrical component is not greater than the predetermined length; and tagging a pair of electrical components in the first layer when a first voltage difference between the pair of electrical components exceeds a first voltage threshold. The first voltage difference is determined based on the first simulation voltage values and the second simulation voltage values. The first voltage threshold is determined based on a lifetime, a yield, and an operation temperature for the electronic layout.

Some embodiments of the present disclosure provide a non-transitory computer-readable medium. The non-transitory computer-readable medium has stored thereon program instructions. Upon execution of the program instructions by a processor, the program instructions cause performance of a set of acts comprising: receiving an electronic layout, the electronic layout including a first plurality of electrical components in a first layer; determining an internal voltage difference within each electrical component in the first layer based on parasitic effect, generating a simulation voltage value for each electrical component in the first layer based on the internal voltage differences; and tagging a pair of electrical components in the first layer when a first voltage difference between the pair of electrical components exceeds a first voltage threshold. The first voltage difference is determined based the simulation voltage value of each electrical component.

Although the present disclosure and its advantages have been described in detail, it should be understood that various changes, substitutions, and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. A method, comprising:
receiving an electronic layout, the electronic layout including a first plurality of electrical components in a first layer;
determining an internal voltage difference within each electrical component in the first layer based on parasitic effect;
generating a simulation voltage value for each electrical component in the first layer based on the internal voltage differences; and
tagging a pair of electrical components in the first layer when a first voltage difference between the pair of electrical components exceeds a first voltage threshold, wherein the first voltage difference is determined based on the simulation voltage value of each electrical component, wherein:
the electronic layout includes a second plurality of electrical components in a second layer, the second layer being adjacent to the first layer;
determining an internal voltage difference within each electrical component in the second layer based on parasitic effect;
generating a simulation voltage value for each electrical component in the second layer based on the internal voltage differences; and
tagging a first electrical component in the first layer and a second electrical component in the second layer when a second voltage difference between the first electrical component in the first layer and the second electrical component in the second layer exceeds a second voltage threshold.

2. The method according to claim 1, wherein the first voltage difference is determined based on the simulation voltage values of the pair of electrical components in the first layer observed at the same time.

3. The method according to claim 1, wherein the first voltage difference is determined to exceed the first voltage threshold when the first voltage difference exceeds the first voltage threshold for at least a predetermined period.

4. The method according to claim 3, wherein the predetermined period is determined based on the first voltage difference, and the predetermined period is lower when the first voltage difference is greater.

5. The method according to claim 1, further comprising extracting location data of each electrical component in the first layer.

6. The method according to claim 5, wherein the pair of electrical components in the first layer is tagged when the pair of electrical components is adjacent according to the location data.

7. The method according to claim 5, wherein the pair of electrical components in the first layer is tagged when the pair of electrical components are within a predetermined distance.

8. The method according to claim 5, wherein the first voltage threshold is determined based on spacing between the tagged pair of electrical components according to the location data.

9. The method according to claim 5, further comprising adjusting a spacing between the tagged pair of electrical components according to the location data.

10. The method according to claim 1, wherein the extracted electronic layout further comprises metal type information of each electrical component in the electronic layout.

11. The method according to claim 10, wherein the first voltage threshold is determined based on a lifetime, a yield, and an operation temperature for the electronic layout.

12. A method, comprising:
receiving an electronic layout, the electronic layout including a first plurality of electrical components in a first layer;
determining an internal voltage difference within each first electrical component in the first layer based on parasitic effect when a length of the first electrical component is greater than a predetermined length;
generating a first simulation voltage value for each first electrical component in the first layer based on the internal voltage differences;
generating a second simulation voltage value for each second electrical component in the first layer, wherein a length of the second electrical component is not greater than the predetermined length; and
tagging a pair of electrical components in the first layer when a first voltage difference between the pair of electrical components exceeds a first voltage threshold, wherein the first voltage difference is determined based on the first simulation voltage value and the second simulation voltage value, the first voltage threshold is determined based on a lifetime, a yield, and an operation temperature for the electronic layout.

13. The method according to claim 12, wherein the first voltage difference is determined based on the simulation voltage values of the pair of electrical components in the first layer observed at the same time.

14. The method according to claim 12, wherein the first voltage difference is determined to exceed the first voltage threshold when the first voltage difference exceeds the first voltage threshold for at least a predetermined period.

15. The method according to claim 12, further comprising extracting location data of each electrical component in the first layer.

16. The method according to claim 15, wherein the pair of electrical components in the first layer is tagged when the pair of electrical components are adjacent according to the location data.

17. The method according to claim 15, wherein the pair of electrical components in the first layer is tagged when the pair of electrical components are within a predetermined distance.

18. The method according to claim 15, the first voltage threshold is determined based on spacing between the tagged pair of electrical components according to the location data.

19. A non-transitory computer-readable medium having stored thereon program instructions that, upon execution by a processor, cause performance of a set of acts comprising:
receiving an electronic layout, the electronic layout including a first plurality of electrical components in a first layer;
determining an internal voltage difference within each electrical component in the first layer based on parasitic effect;

generating a simulation voltage value for each electrical component in the first layer based on the internal voltage differences; and tagging a pair of electrical components in the first layer when a first voltage difference between the pair of electrical components exceeds a first voltage threshold, wherein the first voltage difference is determined based the simulation voltage value of each electrical component, wherein:

the electronic layout includes a second plurality of electrical components in a second layer, the second layer being adjacent to the first layer;

determining an internal voltage difference within each electrical component in the second layer based on parasitic effect;

generating a simulation voltage value for each electrical component in the second layer based on the internal voltage differences; and tagging a first electrical component in the first layer and a second electrical component in the second layer when a second voltage difference between the first electrical component in the first layer and the second electrical component in the second layer exceeds a second voltage threshold.

20. The non-transitory computer-readable medium according to claim 19, wherein the first voltage difference is determined based on the simulation voltage values of the pair of electrical components in the first layer observed at the same time.

* * * * *